(12) United States Patent
Titchener

(10) Patent No.: US 11,135,774 B2
(45) Date of Patent: Oct. 5, 2021

(54) ROD FEEDER FOR THREE-DIMENSIONAL (3D) PRINTING

(71) Applicant: Desktop Metal, Inc., Burlington, MA (US)

(72) Inventor: Paul Titchener, Cambridge, MA (US)

(73) Assignee: Desktop Metal, Inc., Burlington, MA (US)

(*) Notice: Subject to any disclaimer, the term of this patent is extended or adjusted under 35 U.S.C. 154(b) by 0 days.

(21) Appl. No.: 15/957,338

(22) Filed: Apr. 19, 2018

(65) Prior Publication Data
US 2018/0311899 A1 Nov. 1, 2018

Related U.S. Application Data

(60) Provisional application No. 62/489,194, filed on Apr. 24, 2017.

(51) Int. Cl.
*B29C 64/321* (2017.01)
*B29C 64/118* (2017.01)
(Continued)

(52) U.S. Cl.
CPC ............ *B29C 64/321* (2017.08); *B22F 10/10* (2021.01); *B29C 64/118* (2017.08);
(Continued)

(58) Field of Classification Search
CPC ............................ B29C 64/321; B29C 64/329
See application file for complete search history.

(56) References Cited

U.S. PATENT DOCUMENTS

| 995,157 | A | * | 6/1911 | Korman | ............. | B65D 83/0409 |
| | | | | | | 221/266 |
| 1,237,919 | A | * | 8/1917 | Liniewicz | ............... | G07F 17/14 |
| | | | | | | 194/295 |

(Continued)

FOREIGN PATENT DOCUMENTS

| DE | 102014018081 A1 | 6/2016 |
| WO | 2016142472 A1 | 9/2016 |

OTHER PUBLICATIONS

English language machine translation of Lieberwirth (DE102014018081 (A1)).*

(Continued)

*Primary Examiner* — Jason L Lazorcik
(74) *Attorney, Agent, or Firm* — Oak Law, PLLC; Jonathan D. Hall

(57) ABSTRACT

An apparatus, and corresponding method, feeds build material, in the form of rods, to a drive system in a three-dimensional (3D) printing system. The apparatus dispenses a rod to a media tray and into a first groove defined by a flipper arm. The flipper arm is in a substantially horizontal position supported by a bottom ridge of the media tray. The flipper arm is rotated away from the bottom ridge and toward a stopper coupled to the flipper arm and the media tray. The stopper defines a second groove. The apparatus deposits the rod into the drive system via a feed shaft formed by the first and second grooves of the flipper arm and stopper, respectively. The apparatus enables high-speed 3D printing using the rods by overcoming challenges in loading the rods due to brittleness of the rods.

22 Claims, 18 Drawing Sheets

(51) Int. Cl.
- B33Y 30/00 (2015.01)
- B33Y 40/00 (2020.01)
- B29C 64/255 (2017.01)
- B22F 10/10 (2021.01)
- B33Y 10/00 (2015.01)

(52) U.S. Cl.
CPC ............ B29C 64/255 (2017.08); B33Y 30/00 (2014.12); B33Y 40/00 (2014.12); B33Y 10/00 (2014.12)

(56) References Cited

U.S. PATENT DOCUMENTS

| | | | | |
|---|---|---|---|---|
| 4,308,974 | A * | 1/1982 | Jones | A61F 15/001 221/196 |
| 5,351,856 | A * | 10/1994 | Laidlaw | G07F 11/44 194/350 |
| 5,555,965 | A * | 9/1996 | Mishina | A61F 15/003 194/217 |
| 5,730,318 | A * | 3/1998 | Schramm | A24C 5/356 221/197 |
| 5,764,521 | A | 6/1998 | Batchelder et al. | |
| 5,860,563 | A * | 1/1999 | Guerra | B65G 47/24 221/172 |
| 6,102,249 | A | 8/2000 | Sjoboen | |
| 6,390,328 | B1 * | 5/2002 | Obermeier | G07F 11/24 221/203 |
| 6,488,174 | B1 * | 12/2002 | Cho | A47F 1/10 221/237 |
| 7,149,600 | B2 * | 12/2006 | Rippolone | G06Q 10/087 700/237 |
| 7,549,557 | B2 * | 6/2009 | Lehmann | B65G 47/1471 221/208 |
| 9,607,261 | B1 * | 3/2017 | Zonana | G01D 5/2006 |
| 2006/0231566 | A1 | 10/2006 | Indig | |
| 2013/0209739 | A1 | 8/2013 | Fruth | |
| 2014/0363585 | A1 * | 12/2014 | Pialot | B22F 3/1055 427/551 |
| 2018/0015666 | A1 * | 1/2018 | Honda | B29C 64/209 |
| 2019/0105837 | A1 * | 4/2019 | Zehavi | B29C 64/329 |

OTHER PUBLICATIONS

Notification of Transmittal of the International Search Report and the Written Opinion of the International Searching Authority for Int'l Application No. PCT/US2018/028343, titled: Rod Feeder for Three-Dimensional (3D) Printing, dated Oct. 11, 2018.

Invitation to Pay Additional Fees and Partial International Search for Int'l Application No. PCT/US2018/028343, titled: Rod Feeder for Three-Dimensional (3D) Printing, dated Jul. 18, 2018.

* cited by examiner

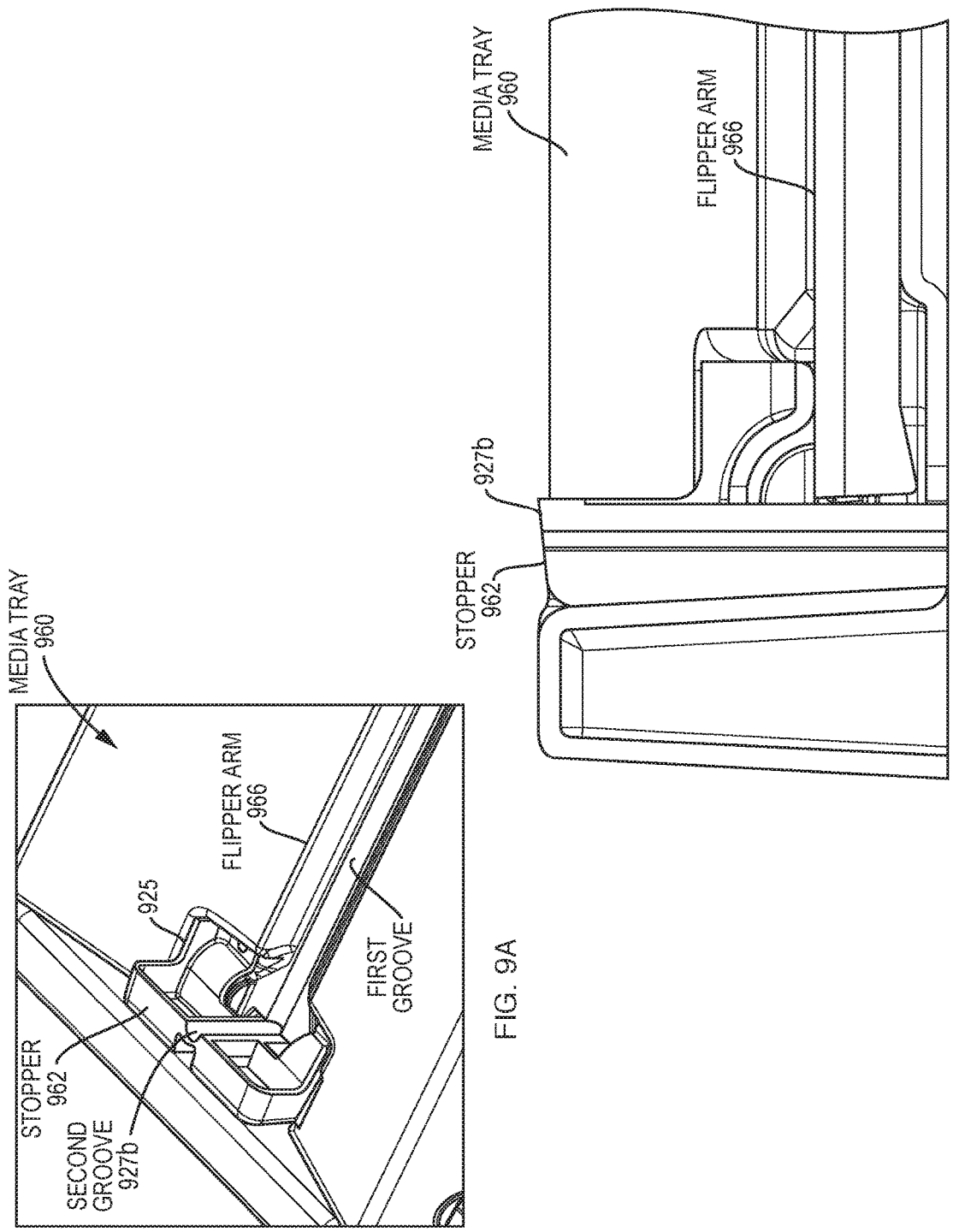

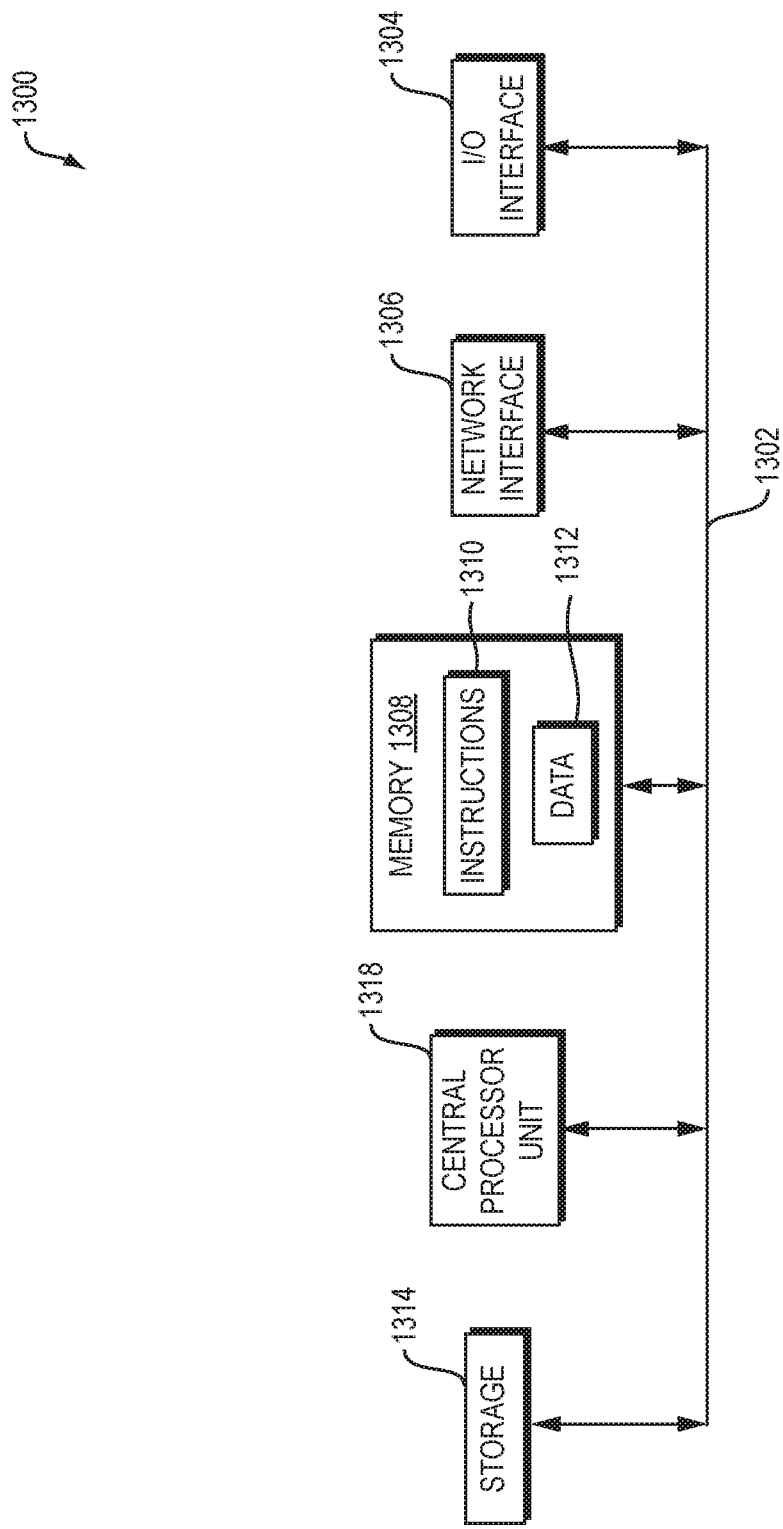

ROD FEEDER FOR THREE-DIMENSIONAL (3D) PRINTING

RELATED APPLICATION

This application claims the benefit of U.S. Provisional Application No. 62/489,194, filed on Apr. 24, 2017. The entire teachings of the above application are incorporated herein by reference.

BACKGROUND

Fused filament fabrication (FFF) provides a technique for fabricating three-dimensional (3D) objects from a thermoplastic or from similar materials. Machines using this technique can fabricate a 3D object, additively, by depositing materials in layers to build up a physical object, additively, layer-by-layer, based on a computer model of the 3D object.

SUMMARY

According to an example embodiment, a cartridge for dispensing rods within a three-dimensional (3D) printing system may comprise a housing, ramp, and roller. The ramp may be interior to the housing. The housing may be configured to store rods stacked horizontally along an interior length of the housing, the housing defining a housing exit to dispense rods. The roller may be disposed at the housing exit and defines a slot therein along at least a portion of a length of the roller. The roller may be configured to (i) receive a rod in the slot as the roller rotates within the housing and (ii) dispense the rod from the slot as the slot rotates toward the housing exit, the ramp angled to direct rods toward the roller that, in turn, dispenses the rods via the slot to the housing exit.

The housing exit may be disposed at a bottom of the housing.

The slot may be a first slot. The roller may further define a second slot therein along the at least a portion of the length of the roller, the second slot located opposite the first slot of the roller.

The roller may further define a plurality of slots along the at least a portion of the length of the roller to receive rods as the roller rotates within the housing.

The roller may include at least one protrusion along a portion of its circumference, the at least one protrusion configured to displace rods within the housing.

The at least one protrusion may be configured to displace rods to prevent the rods from forming a bridge over the roller.

The roller may include an interface. The 3D printing system may include a roller drive assembly configured to control rotation of the roller via the interface.

According to another example embodiment, a three-dimensional (3D) printing system may comprise a feeder assembly including a cartridge and a media tray with a flipper arm and a stopper coupled to the flipper arm. The cartridge may be configured to contain and dispense a rod. The flipper arm may define a first groove to hold the rod and may be configured to receive the rod from the cartridge in the first groove while in a substantially horizontal position supported by a bottom ridge of the media tray. The stopper may be coupled to the flipper arm and the media tray and may define a second groove. The flipper arm may be further configured to rotate away from the bottom ridge and toward the stopper to deposit the rod into a drive system of the 3D printing system via a feed shaft formed by the first and second grooves of the flipper arm and stopper, respectively.

The flipper arm may be further configured to rotate to a substantially vertical position.

The housing exit may be disposed at a bottom of the housing.

The media tray may include at least one inclined side configured to direct a falling rod dispensed from the cartridge to the first groove in the flipper arm.

The cartridge may include a housing, ramp, and roller. The ramp may be interior to the housing. The housing may be configured to store rods stacked horizontally along an interior length of the housing, the housing defining a housing exit to dispense rods. The roller may be disposed at the housing exit and defines a slot therein along at least a portion of a length of the roller. The roller may be configured to (i) receive a rod in the slot as the roller rotates within the housing and (ii) dispense the rod from the slot as the slot rotates toward the housing exit, the ramp angled to direct rods toward the roller that, in turn, dispenses the rods via the slot to the housing exit.

The feeder assembly may further include a cartridge interface configured to engage a roller drive assembly with the roller and cause the cartridge to dispense the rod.

The feeder assembly may further include a flipper arm coupling that is configured to couple the flipper arm to an actuator to rotate the flipper arm toward the stopper.

The 3D printing system may further comprise a sensor configured to detect a presence of the rod in the first groove, and wherein the actuator may be further configured to transition the flipper arm between the substantially horizontal position and a substantially vertical position via the coupling based on whether the presence of the rod is detected.

According to another example embodiment, a method for dispensing rods within a three-dimensional (3D) printing system may comprise: dispensing a rod to a media tray and into a first groove defined by a flipper arm in a substantially horizontal position supported by a bottom ridge of the media tray; rotating the flipper arm away from the bottom ridge and toward a stopper coupled to the flipper arm and the media tray, the stopper defining a second groove; and depositing the rod into a drive system of the 3D printing system via a feed shaft formed by the first and second grooves of the flipper arm and stopper, respectively.

The rotating may include rotating the flipper arm to a substantially vertical position.

The method may further comprise directing the rod into the first groove of the flipper arm via an inclined wall of the media tray.

The method may further comprise storing rods, stacked horizontally, along an interior length of a housing of a cartridge, the housing defining a housing exit to dispense rods, wherein the dispensing includes dispensing the rod from the housing exit.

The method may further comprise rotating a roller disposed at the housing exit, the roller defining a slot therein along at least a portion of a length of the roller, wherein the dispensing includes dispensing the rod from the slot as the slot rotates toward the housing exit.

The method may further comprise directing rods toward the roller via a ramp, the ramp interior to the housing and angled to direct rods toward the roller.

The method may further comprise preventing the rods stored from forming a bridge over the roller by displacing the rods stored in the housing via a protrusion along a portion of a circumference of the roller.

According to yet another example embodiment, an apparatus for dispensing rods within a three-dimensional (3D) printing system may comprise: means for dispensing a rod to a media tray and into a first groove defined by a flipper arm in a substantially horizontal position supported by a bottom ridge of the media tray; means for rotating the flipper arm away from the bottom ridge and toward a stopper coupled to the flipper arm and the media tray, the stopper defining a second groove; and means for depositing the rod into a drive system of the 3D printing system via a feed shaft formed by the first and second grooves of the flipper arm and stopper, respectively.

It should be understood that example embodiments disclosed herein can be implemented in the form of a method, apparatus, system, or computer readable medium with program codes embodied thereon.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 9A is a close-up view of an example embodiment of a media tray with a flipper arm in a horizontal position and a stopper.

FIG. 9B is a side view of the example embodiment of FIG. 9A.

FIG. 13 is a block diagram of an example internal structure of a computer optionally within an embodiment disclosed herein.

DETAILED DESCRIPTION

A description of example embodiments follows.

In fused filament fabrication (FFF), a filament, in a form of a continuous strand, may be continuously fed into a heated, cylindrical, tubular structure where it is melted and then pushed out of an extruder nozzle. A drive system may control entry of such a filament into a heater via an actuator of the drive system. The filament acts both as a source of "fresh" build material and as a plunger or piston which creates pressure that pushes molten material out from the extruder nozzle. Due to demand for printed structures composed of metals and ceramics with low production times, high-speed printing of metal- and ceramic-laden thermoplastic materials is useful. Such metal- and ceramic-laden thermoplastic materials may be used as a build material that is loaded (e.g., fed) to a drive system of a three-dimensional (3D) printing system. Such materials present challenges in loading the build material into the 3D printing system owing to their increased brittleness relative to traditional 3D printing plastics. Metal rods may be used, beneficially, in 3D printing of metals, and such rods may be several centimeters in length with a diameter of only a few millimeters. Build material, also referred to interchangeably herein as feedstock or media, that is in a form of a discrete element, as opposed to a continuous strand, may be referred to interchangeably herein as a rod. An example embodiment disclosed herein enables high-speed printing of such rods by overcoming challenges of loading the rods due to brittleness of the rods.

In 3D printing, a design, such as a computer-aided drafting (CAD) file, may be provided to a computer operably connected or integrated within a 3D printing system (e.g., a 3D metal printer), and a 3D object, represented by the CAD file, may be manufactured in a layer-by-layer fashion by the 3D printing system. In general, 3D printing system that uses metal as a build material may be referred to interchangeably herein as a 3D metal printer, and such a 3D metal printer may deposit metal, metal alloys, or other metallic compositions for forming the 3D object using fused filament fabrication or similar additive manufacturing techniques.

Figure 1A:
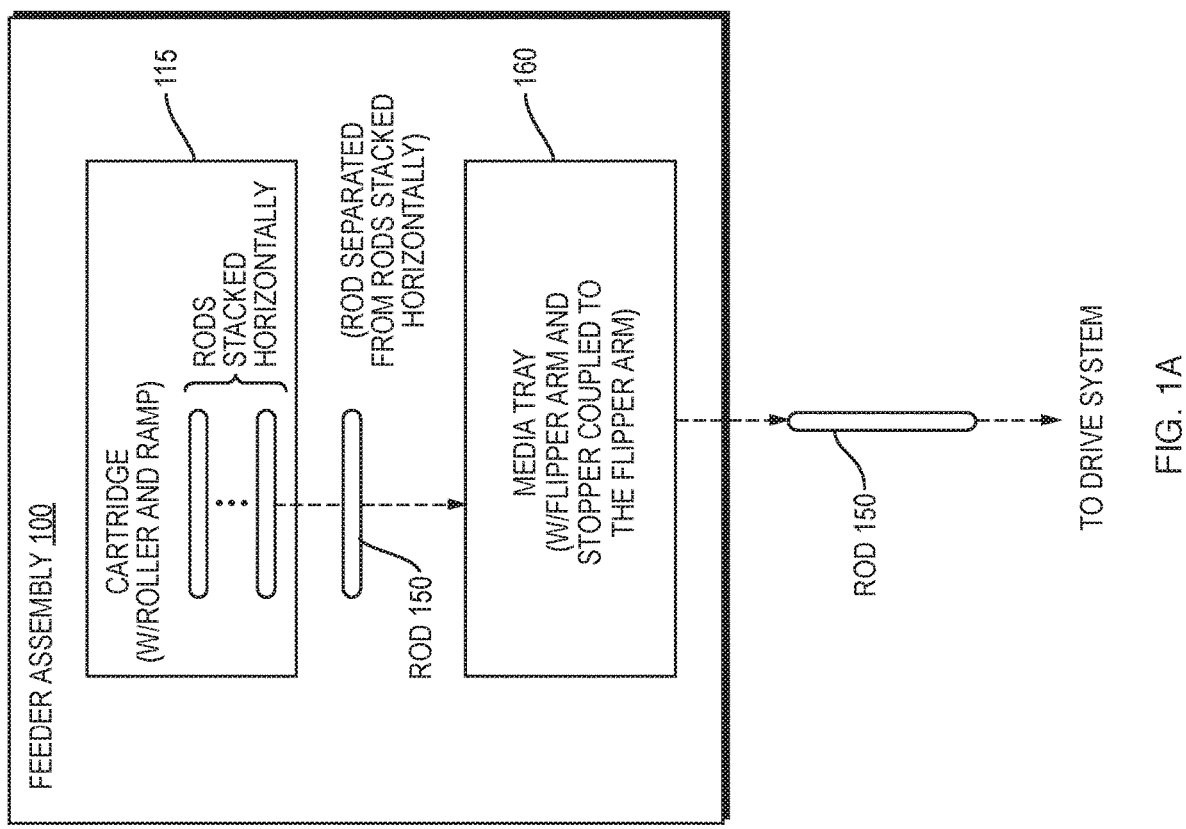
FIG. 1A is a block diagram of an example embodiment of a feeder assembly for dispensing rods within a three-dimensional (3D) printing system.

FIG. 1A is a block diagram of an example embodiment of a feeder assembly 100 for feeding rods, such as the rod 150, in a three-dimensional (3D) printing system, such as the 3D printing system 101 of FIG. 1C, disclosed below, or any other suitable 3D printing system. The feeder assembly 100 includes a cartridge 115 with a roller (not shown) and ramp (not shown), such as disclosed further below with regard to FIG. 2, and a media tray 160 with a flipper arm (not shown) and a stopper (not shown) that is coupled to the flipper arm, such as the flipper arm 166 coupled to the stopper 162 of FIG. 1B, disclosed below. An example embodiment of the cartridge 115 in combination with an example embodiment of the media tray 160 enables high-speed printing of rods by enabling the feeder assembly 100 to load the rod 150 into a drive system (not shown), such as the drive system 104 of FIG. 1C, disclosed further below, while maintaining structural integrity of the rod 150 and, thus, overcomes a challenge of loading the rod 150 due to its brittleness.

Figure 1B:
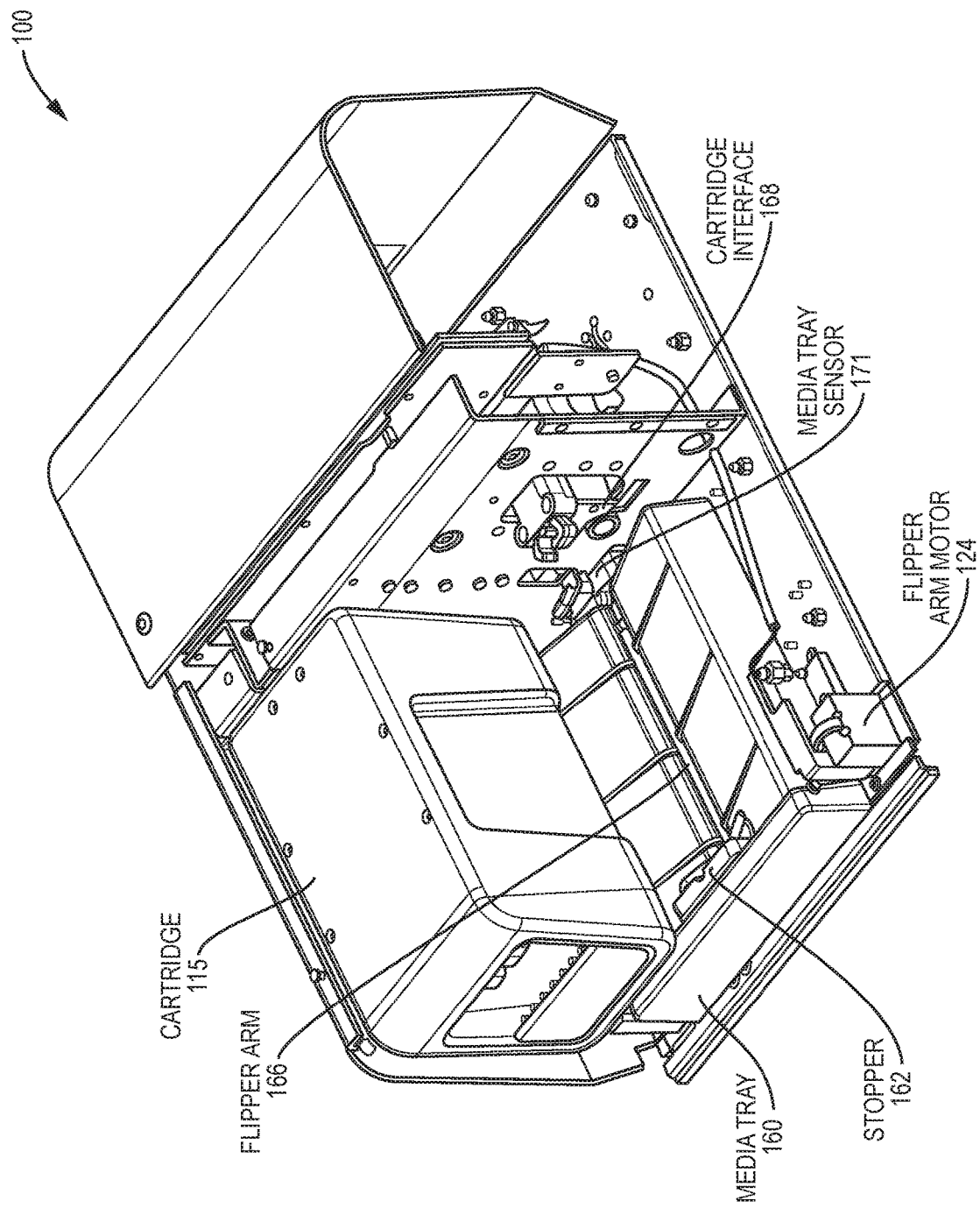
FIG. 1B is a computer-aided drafting (CAD) drawing of an example embodiment of the feeder assembly of FIG. 1A.

FIG. 1B is a computer-aided drafting (CAD) drawing of an example embodiment of the feeder assembly 100 of FIG.

1A, disclosed above. According to the example embodiment, the feeder assembly 100 includes the cartridge 115 and the media tray 160 with a flipper arm 166 and stopper 162 coupled to the flipper arm 166. The cartridge 115 contains rods, such as the rod 150, disclosed above. The cartridge 115 includes a roller (not shown) and ramp (not shown), such as disclosed further below with regard to FIG. 2. The feeder assembly 100 further includes a cartridge interface 168 to engage the roller of the cartridge 115 with a roller drive assembly (not shown). The roller drive assembly drives rotation of the roller to enable the cartridge 115 to dispense rods to the media tray 160 and into the flipper arm 166.

The flipper arm 166 may define a first groove (not shown) to hold the rod 150 and may be configured to receive the rod 150 from the cartridge 115 in the first groove while in a substantially horizontal position supported by a bottom ridge (not shown) of the media tray 160, such as the bottom ridge 867 of FIG. 8B, disclosed further below. The stopper 162 may define a second groove (not shown). The flipper arm 166 may be further configured to rotate away from the bottom ridge and toward the stopper 162 to deposit the 150 rod into a drive system of a 3D printing system, such as the drive system 104 of the 3D printing system 101 of FIG. 1C, disclosed below, via a feed shaft that is formed by the first and second grooves of the flipper arm and stopper, respectively, such as disclosed further below with regard to FIGS. 9A-D and FIG. 10.

According to an example embodiment, the feeder assembly 100 may include an actuator, such as the flipper arm motor 124 or any other suitable actuator, that may be configured to control such movement of the flipper arm 166, either directly or via a coupling (not shown). Such movement may be in response to sensed information of a media tray sensor 171. For example, the sensed information may be in a form of a signal(s) that represent whether the rod 150 is present in the first groove of the flipper arm 166 and may further represent a position of the rod 150 within the first groove.

According to the example embodiment, the drive system, such as the drive system 104 of FIG. 1C, disclosed below, does not control the feeding, that is, loading of the build material into the drive system. Rather, the feeder assembly 100 controls feeding of the rods to the drive assembly, on a rod-by-rod basis.

Figure 1C:
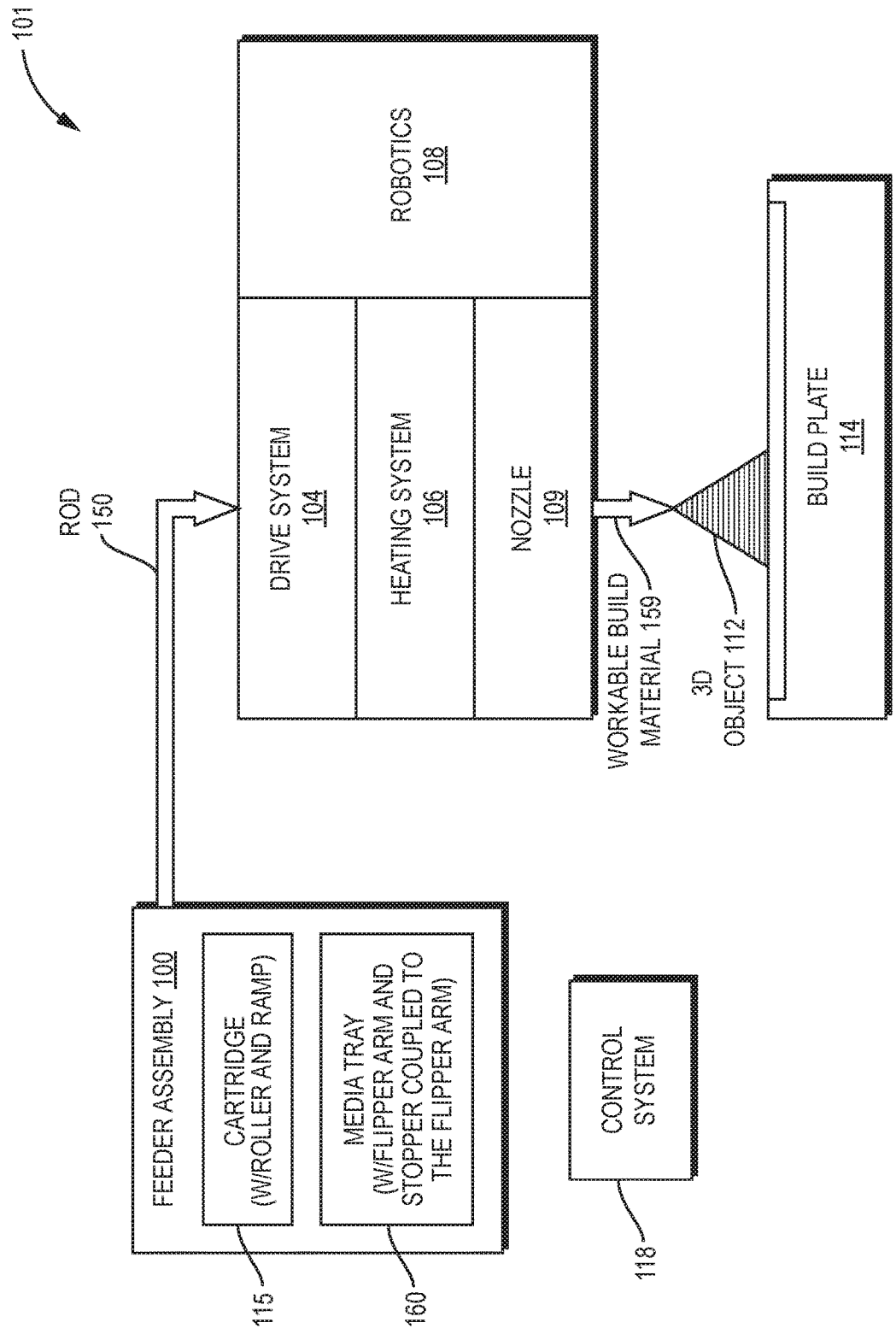
FIG. 1C is a block diagram of an example embodiment of an additive manufacturing system.

FIG. 1C is a block diagram of an example embodiment of an additive manufacturing system 101, also referred to interchangeably herein as a three-dimensional (3D) printing system 101. The 3D printing system 101 comprises a feeder assembly 100, drive system 104, heating system 106, and nozzle(s) 109. The feeder assembly 100 includes the cartridge 115 and the media tray 160 with a flipper arm (not shown) and a stopper (not shown) coupled to the flipper arm (not shown), as disclosed above. The cartridge 115 is configured to contain and dispense the rod 150. The flipper arm may define a first groove to hold the rod 150 and may be configured to receive the rod 150 from the cartridge in the first groove while in a substantially horizontal position supported by a bottom ridge (not shown) of the media tray 160. The stopper may be coupled to the flipper arm and the media tray and may define a second groove (not shown).

The flipper arm may be further configured to rotate away from the bottom ridge and toward the stopper to deposit the rod 150 into the drive system 104 of the 3D printing system 101 via a feed shaft (not shown) formed by the first and second grooves of the flipper arm and stopper, respectively. The drive system 104 may be configured to propel the rod 150 into the heating system 106. The heating system 106 may be configured to receive the rod 150 propelled from the drive system 104 and heat the rod 150 into a workable build material 159. The nozzle(s) 109 may be configured to extrude the workable build material 159 to print a 3D object 112. By concurrently controlling robotics 108 to position the nozzle(s) 109 along an extrusion path relative to a build plate 114, the 3D object 112 may be fabricated on the build plate 114 within a build chamber (not shown). A control system 118 may manage operation of the 3D printing system 101 to fabricate the 3D object 112 according to a 3D model (not shown) using a FFF process, or the like.

Figure 2:
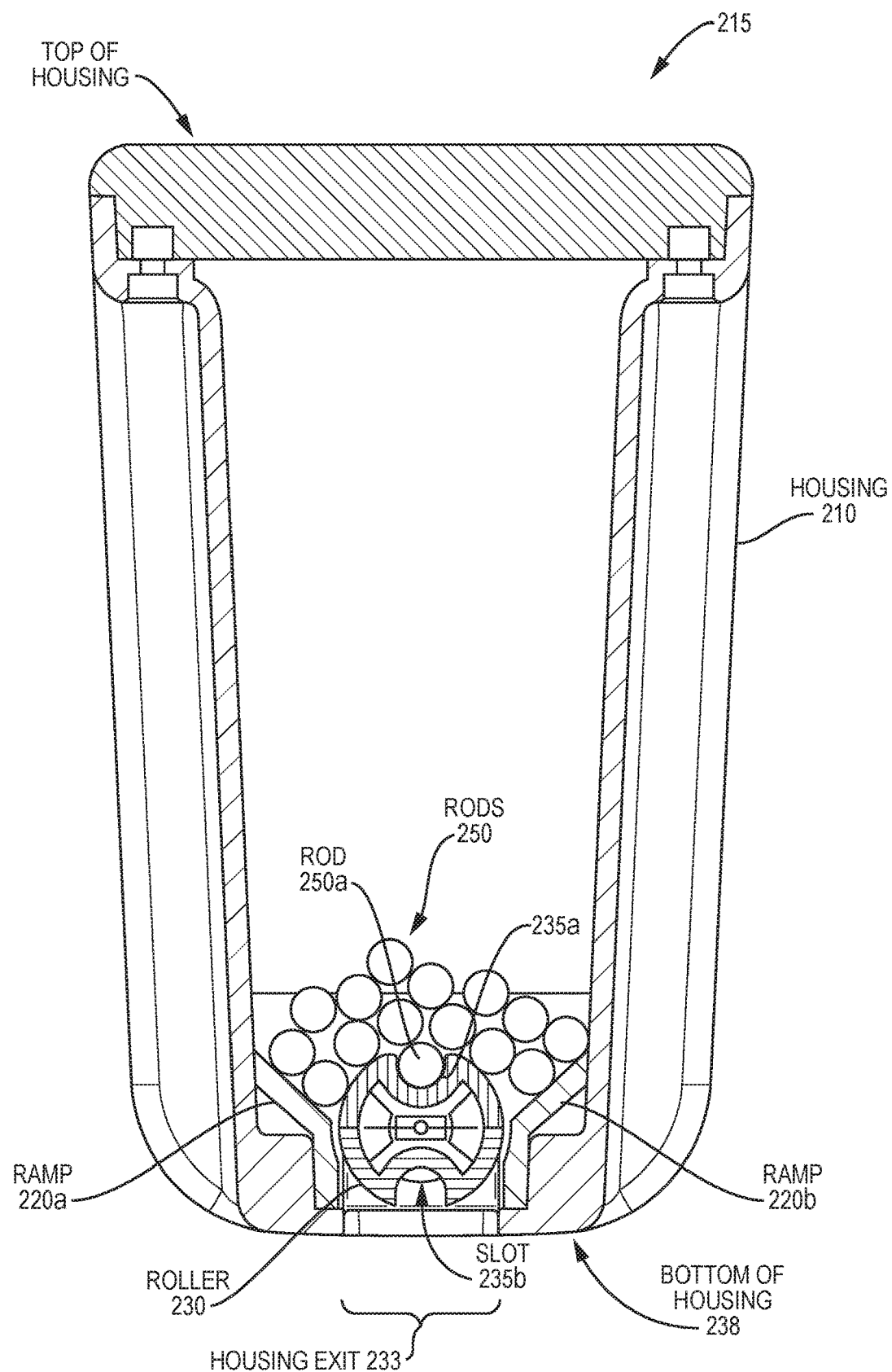
FIG. 2 is a cross-sectional view of an example embodiment of a cartridge for a 3D printing system.

FIG. 2 is a cross-sectional view of an example embodiment of a cartridge 215 for a 3D printing system, such as the cartridge 115 of the 3D printing system 101 of FIG. 1C, disclosed above. The cartridge 215 comprises a housing 210, roller 230, and ramps 220a and 220b. The housing 210 may be configured to store rods 250 stacked horizontally along an interior length of the housing 210, the housing 210 defining a housing exit 233 to dispense rods. The roller 230 may be disposed at the housing exit 233 and defines slots 235a and 235b therein along at least a portion of a length of the roller 230. The roller 230 may be configured to (i) receive a rod 250a in the slot 235a as the roller 230 rotates within the housing 210 and (ii) dispense the rod 250a from the slot 235a as the slot 235a rotates toward the housing exit 233. The ramps 220a and 220b are interior to the housing 210 and angled to direct rods toward the roller 230.

According to an example embodiment, the housing exit 233 may be disposed at a bottom 238 of the housing 210, such as illustrated in FIG. 2. However, the housing exit 233 may be disposed anywhere along the housing 210 such that the slot 235a may rotate toward the housing exit in a manner that enables the rod 250a to exit the cartridge 215.

It should be understood that which slot 235a or 235b receives the rod 250a is rotatably changing based on rotation of the roller 230. The rods 250 may be dispensed from the cartridge 215 via the roller 230. Ramp(s) that are interior to the housing 210, such as the ramps 220a and 220b, may prevent the rods 250 from exiting the cartridge 215 except via slot(s) of roller(s), such as the slots 235a and 235b of the roller 230. It should be understood that while the roller 230 defines two slots, that is, the slots 235a-b, a single slot may be employed. Further, a single ramp of the ramps 220a and 220b may be employed wherein a surface abutting the roller 230 may be employed to replace a ramp. The surface may be any suitable surface abutting the roller 230 that prevents the rods 250 from exiting the cartridge 215 except via a slot of the roller 230. The surface may be a flat surface, such as the vertical wall 331 of FIG. 3, disclosed below, or any other suitable surface.

As disclosed above, the cartridge 215 includes ramps 220a and 220b that are angled to direct the rods 250 toward the roller 230. The ramps 220a and 220b are interior to the housing and may be formed within a body of the housing 210 or assembled within the housing 210. The rods 250 slide down the ramps 220a and 220b toward the roller 230. An external driver (not shown) may engage the cartridge 215 and drive rotation of the roller 230. The roller 230 may turn and, e.g., twice per revolution, the rod 250a drops down into the slot 235a embedded along at least a portion of the length of the roller 230. According to an example embodiment, a 3D printing system, such as the 3D printing system 101 of FIG. 1C, disclosed above, may be configured to control rotation of the roller 230 within the cartridge 215 external to the feeder assembly 100. Alternatively, such a roller drive system may be included in the feeder assembly 100. It should be understood that the roller drive system may be configured to rotate the roller 230 in any suitable direction that enables a slot in the roller 230 to rotate toward the housing exit 233. Further, the housing 210 may define a plurality of housing exits to dispense rods.

As the roller 230 turns over, the rod 250a may be caught within the slot 235a and rotated out of the housing 210 and dispensed from the cartridge 215 via the housing exit 233. The roller 230 may have one slot within the roller 230, such as the slot 235a, or a plurality of slots, such as the slots 235a and 235b. The slot may be a first slot and the roller may further define a second slot therein along the length of the roller. The second slot may be located opposite the first slot of the roller, such as the slots 235a and 235b.

The ramps 235a and 235b abut the roller 230 to prevent exit of the rods 250 from the roller 230 except for exit from the housing exit 233 via slot(s) of the roller 230. An angle (not shown) at which the ramps 235a and 235b abut the roller 230 may be configured so as to prevent a jam of any of the rods 250, that is, to prevent the rods 250 from being stuck within the housing 210. Such an angle is disclosed further below with regard to FIG. 4. A slot depth of the slots 235a and 235b may be defined such that the slots are neither too deep—where portions of multiple rods may enter causing a rod to get pinched between a ramp and the slot, resulting in a jam, nor too shallow—where a rod catches on another rod or a ramp. A slot may be referred to interchangeably herein as a depression, recess, notch, or groove.

The roller 230 may further include a protrusion (not shown) along a portion of its circumference, the protrusion configured to displace rods within the housing 210. The protrusion may be configured to displace the rods 250 to prevent formation of a bridge over the roller 230, such as the bridge 756 disclosed further below with regard to FIG. 7.

According to an example embodiment, the cartridge 215 may include a radio-frequency identification (RFID) tag (not shown). Such an RFID tag may be configured to contain electronically-stored information about the cartridge of elements or the 3D printing system. Such electronically-stored information may include any suitable information, such as a number of rods 250 housed by the cartridge 215, a type of material of the rods 250, identifier of a manufacturer of the rods 250, number of rods dispensed, timestamps, or any other suitable information related to the feeder assembly, 3D printing system, or rods used for printing.

Figure 3:
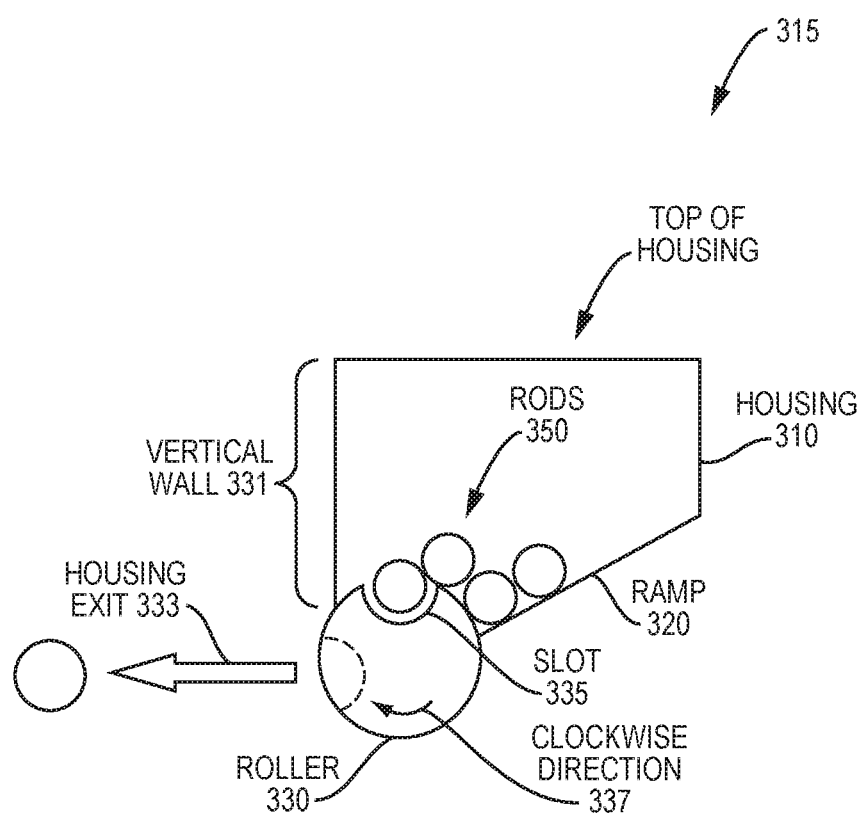
FIG. 3 is a cross sectional view of another example embodiment of a cartridge for a 3D printing system.

FIG. 3 is a cross sectional view of another example embodiment of a cartridge 315 for a 3D printing system. The cartridge includes a roller 330 with a single ramp 320. A vertical wall 331 abuts the roller 330. The housing exit 333 for the rods 350 is located to the side of the cartridge 315 instead of at the bottom 338 of the housing 310. It should be understood that rotation of the roller 330 to rotate the slot 335 toward the housing exit 333 be in any suitable direction. According to an example embodiment, for a case where a single ramp is employed, such as the single ramp 320, rotation of the roller 330 may be configured such that a slot located at an upper surface of the roller 330, such as the slot 335, travels a shortest distance toward the single ramp 320. For example, in the example embodiment of FIG. 3, the shortest distance would be traversed based on a clockwise direction 337. However, it should be understood that even for the case where a single ramp is employed, rotation of the roller 330 may be in any suitable direction that rotates the slot 335 toward the housing exit 333 and need not be the clockwise direction 337.

Figure 4:
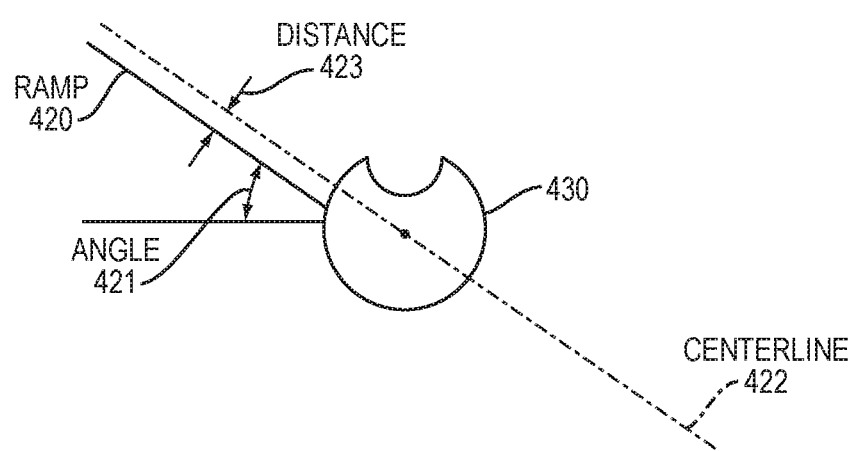
FIG. 4 is a block diagram of an example embodiment of an angle of a ramp.

FIG. 4 is a block diagram of an example embodiment of an angle 421 of a ramp 420 that is interior to a housing (not shown) of a cartridge (not shown) and angled to direct rods (not shown) toward the roller 430. The angle 421 may be such that the ramp 420 is parallel to a center line 422 and at a given distance 423 from the center line 422 that enables the ramp 420 to contact the roller 430. The angle 421 and given distance 423 may be configured to enable clean separation of a given rod from the rest of the rods in the cartridge such that the given rod enters the slot of the roller 430 and does not get stuck on the ramp 420.

Figure 5:
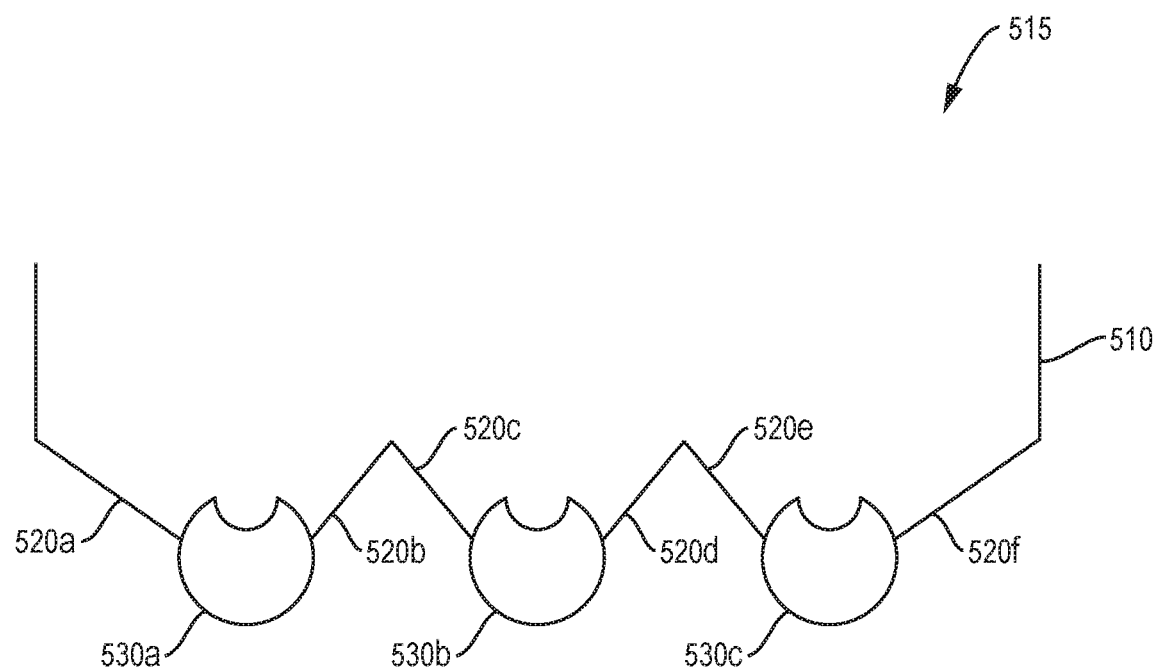
FIG. 5 is a block diagram of an example embodiment of a cartridge with multiple rollers and multiple ramps.

FIG. 5 is a block diagram of an example embodiment of a cartridge 515 with multiple rollers 530a, 530b, and 530c, and multiple ramps 520a, 520b, 520c, 520d, 520e, and 520f. It should be understood that the rollers 530a-c may have a single slot or multiple slots and that the outermost ramps 520a and 520f may be replaced by vertical walls. The multiples ramps are positioned interior to the housing 510 and angled to direct rods toward the rollers 530a-c to prevent rods from being dispensed except via slots in the rollers 530a-c.

Figure 6:
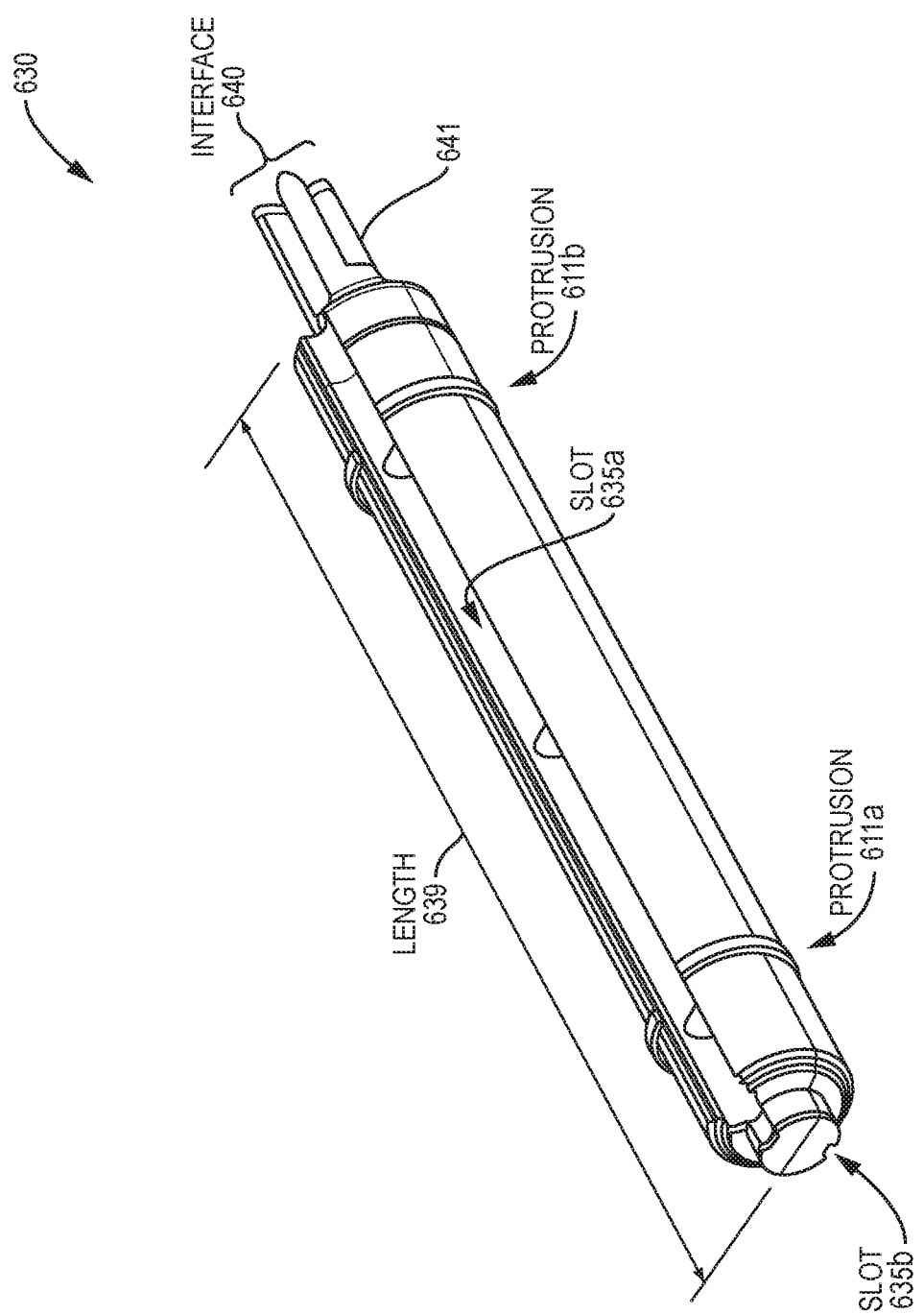
FIG. 6 is a CAD drawing of an example embodiment of a roller used in a cartridge for a 3D printing system.

FIG. 6 is a CAD drawing of an example embodiment of a roller 630 that may be used in a cartridge for a 3D printing system. The roller 630 defines a first slot 635a and a second slot 635b located at opposite sides along a circumference of the roller 630. At one end of the roller 630, is an interface 640, also referred to interchangeably herein as a roller interface, configured to engage with a 3D printing system, such as the 3D printing system 101 of FIG. 1C, disclosed above, to allow a mechanism of the 3D printing system to drive rotation of the roller 630. The roller 630 has agitator bumps 610 (also referred to interchangeably herein as protrusions) protruding along the circumference of the roller 630. The bumps 610a and 610b are configured to prevent media, such as the rods 250 of FIG. 2, disclosed above, from forming an arch bridge over the roller 630, preventing the rods 250 from dropping down into a slot of the roller 630, such as the first slot 635a or the second slot 635b disposed along the length 639 of the roller 630. According to the example embodiment, the interface 640 has angled prongs, such as the angled prong 641. However, it should be understood that the interface 640 may have any suitable shape for engaging with a drive mechanism, such as via the cartridge interface 168 of the feeder assembly of FIG. 1B, disclosed above.

Turning back to FIG. 1B, the cartridge 115 may be held in place via a locking mechanism (not shown), such as a clip or any other suitable locking mechanism to secure a location of the cartridge 115 within the feeder assembly 100. Such a locking mechanism prevents the cartridge from being pushed out (e.g., released) from the feeder assembly 100 in an event a roller, such as the roller 630 of FIG. 6, disclosed above, employed by the cartridge 115 is activated, that is, caused to rotate.

Figure 7:
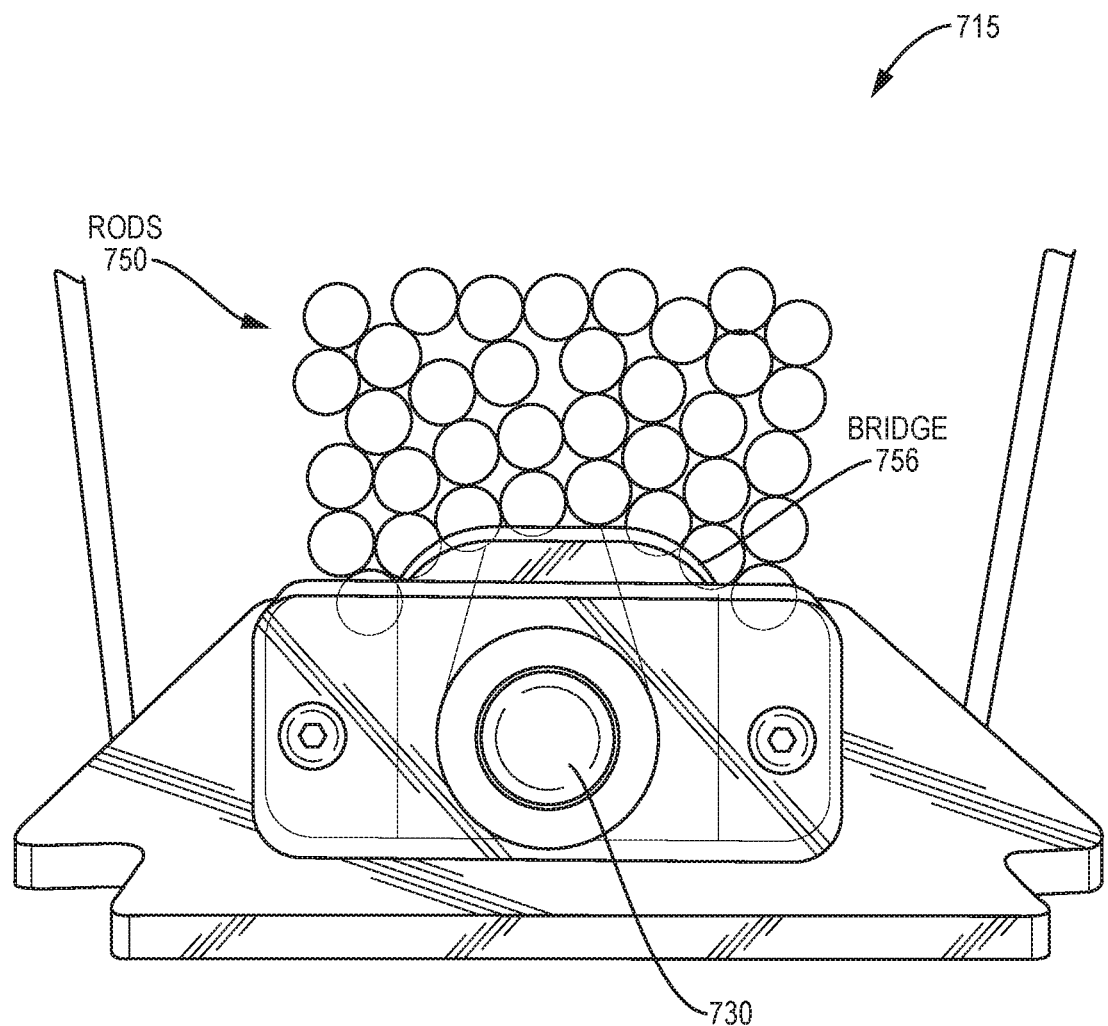
FIG. 7 is a cross-sectional view of an example embodiment of a cartridge exhibiting bridging of build material.

FIG. 7 is a cross-sectional view of an example embodiment of a cartridge 715 exhibiting bridging of build material, that is, the rods 750. Such bridging may be referred to interchangeably herein as rod bridging. FIG. 7 illustrates such rod bridging, wherein the rods 750 become positioned in a manner that their weight is displaced and distributed to form a bridge 756 over the roller 730, preventing individual rods of the rods 750 from falling into a slot of the roller 730, such as the slot 635a of the roller 630 of FIG. 6, disclosed above. As disclosed above with regard to FIG. 6, the agitator bumps 610a and 610b (i.e., protrusions) prevent such rod bridging. According to an example embodiment, the agitator bumps 610a and 610b, also referred to interchangeably herein as protrusions, may push up the rod media, that is, the rods 750 of FIG. 7, once per revolution and thus, break up bridge formation and, thus, prevent a situation in which an arch, that is, the bridge 756, is formed of the rods 750 which could otherwise develop over the roller 730.

Further, such agitator bumps, such as the agitator bumps 610a and 610b, enable a smaller overall cartridge size for a cartridge for a given diameter of rod relative to use of a roller absent such agitator bumps. A ratio between a diameter of the rods 750 and diameter of the roller 730 may be configured to prevent jamming. The protrusions allow a smaller diameter of the roller 730 to reduce the size of cartridge for a given diameter of the rods 750.

Figure 8A:
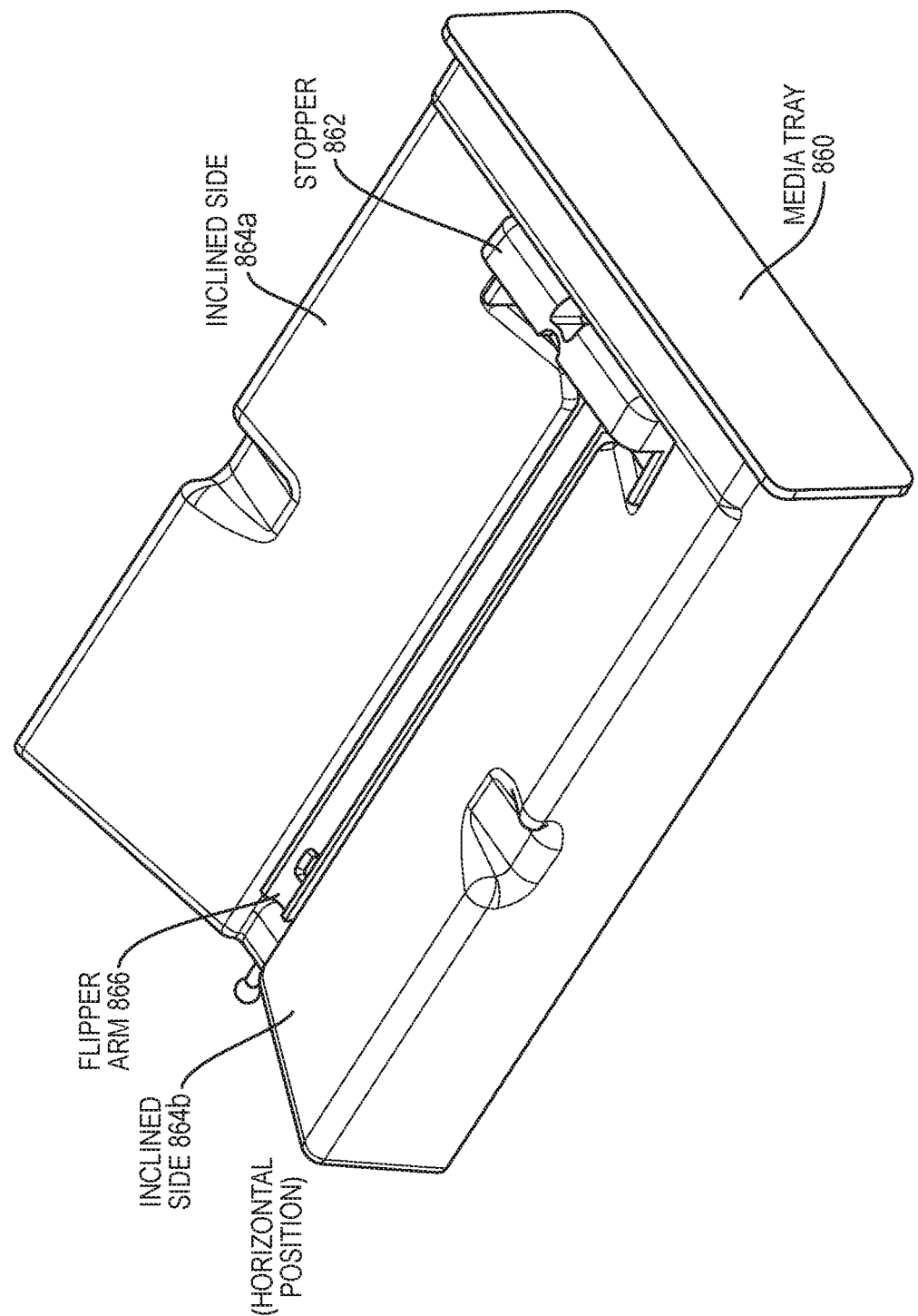
FIG. 8A is a CAD drawing of a top-side view of an example embodiment of a media tray.

FIG. 8A is a CAD drawing of a top-side view of an example embodiment of a media tray 860. The media tray 860 may be used for loading a rod into a drive system of a 3D printing system, such as the drive system 104 of the 3D printing system 101, disclosed above with reference to FIG. 1C. According to an example embodiment, as the rods drop out of a cartridge, such as the rods 250 that may drop out of the cartridge 215 of FIG. 2, disclosed above, they fall into the media tray 860 for further dispensing.

According to an example embodiment, the media tray 860 may be removable from the feeder assembly to avoid contamination from different materials being used in the 3D printing system. The media tray 860 may have inclined sides 864a and 864b that direct a falling rod into a flipper arm 866. It should be understood that the media tray 860 may include a single inclined side. For example, the multiple inclined slides may be used based on multiple cartridges being employed by the feeder assembly with each cartridge dispensing to the media tray via a respective inclined side. The inclined side may be configured to direct a falling rod dispensed from the cartridge to a groove in the flipper arm 866. Alternatively, the media tray 860 may not include any inclined sides. For example, a housing exit of a cartridge, such as the housing exit 233 of the cartridge 215 of FIG. 2, disclosed above, may be positioned over the media tray 860 in a manner that enables rods to be dispensed directly into the flipper arm 866 without traversing an inclined side of the media tray 860.

The flipper arm 866 may be configured to rotate from a horizontal position to a vertical position. The flipper arm 866 may be referred to interchangeably herein as a rotary flipper or simply a flipper. The flipper arm 866 lies along a bottom ridge 867 of the media tray 860 and may be configured to receive and hold a rod. The bottom ridge 867 may be a recess defined by the media tray 860 along a bottom (e.g., floor) of the media tray 860. The flipper arm 866 may be configured to rotate at one end at a stopper 862 to the vertical position, as illustrated in FIG. 8B, disclosed below.

Figure 8B:
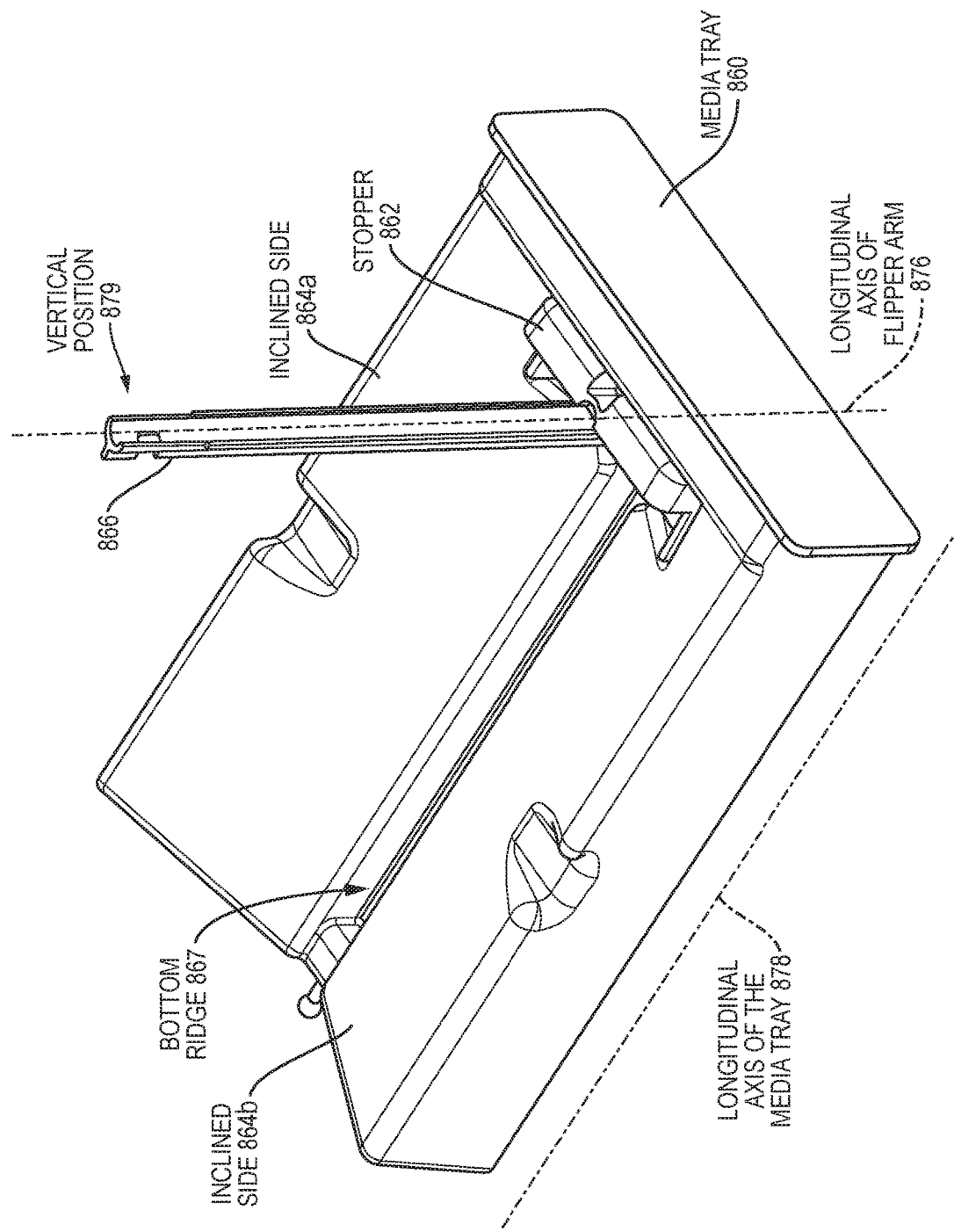
FIG. 8B is a CAD drawing of a top-side view of another example embodiment of a media tray.

FIG. 8B is a CAD drawing of a top-side view of another example embodiment of the media tray 860 of FIG. 8A, disclosed above. In the example embodiment of FIG. 8B, the flipper arm 866 is in a vertical position 879; whereas in FIG. 8A, the flipper arm 866 is in the horizontal position. In the example embodiment of FIG. 8B, the vertical position is such that a longitudinal axis 876 of the flipper arm 866 is perpendicular to a longitudinal axis 878 of the media tray, the longitudinal axis 878 of the media tray being substantially parallel with the bottom ridge 867. It should be understood that a target position of the flipper arm 866 for dispensing a rod may not be the vertical position 879. For example, that target position may be such that the longitudinal axis 878 of the flipper arm 866 is substantially parallel to an axis of movement of a drive system, such as the axis 1184 of movement disclosed below with regard to FIG. 11.

Figure 8C:
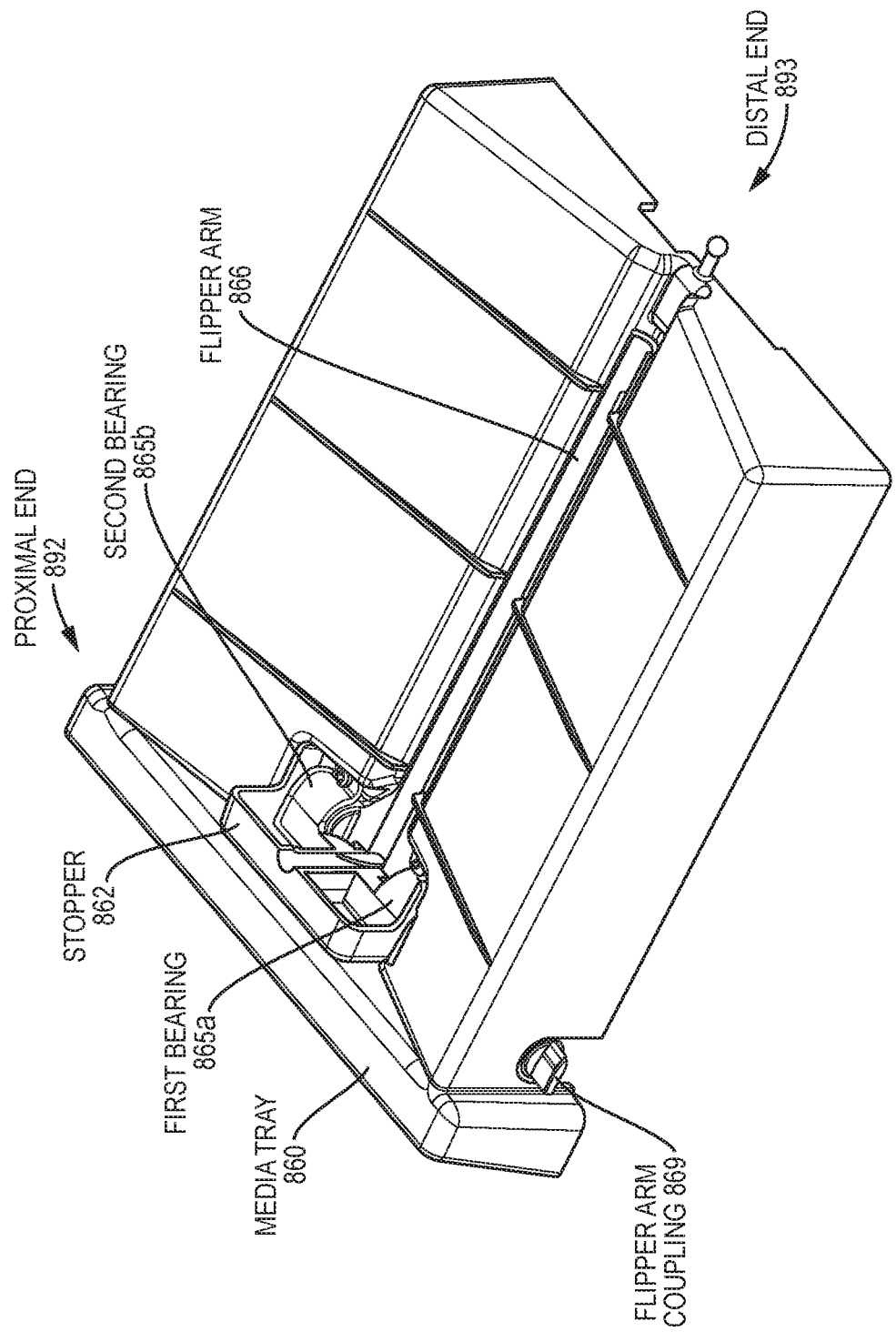
FIG. 8C is a CAD drawing of a top-side view of yet another example embodiment of a media tray.

FIG. 8C is a CAD drawing of a top-side view of another example embodiment of the media tray 860 of FIG. 8A, disclosed above. According to the example embodiment, a flat coupling 869, also referred to interchangeably herein as a flipper arm coupling 869, may be used to transfer torque to the flipper arm 866 to transition the flipper arm 866 between horizontal and vertical positions. A position of the flipper arm 866 may be sensed by current detection on a motor, such as the flipper arm motor 124 of FIG. 1B, disclosed above, in an event the flipper arm 866 is pushed up against the stopper 862. The position of the flipper arm 866 may be sensed in any suitable way. For example, the position may be sensed with limit switches or an encoder (not shown) or via any other suitable mechanism. According to an example embodiment, the stopper 862 may be mounted to the media tray 860, for example, by being screwed down to the media tray 860, or via any other suitable way. The stopper 862 may be configured to hold a first bearing 865a and a second bearing 865b. The first bearing 865a and the second bearing 865b may be configured to support an end of the flipper arm 866. As such, the stopper 862 may be coupled to the flipper arm 866 via the first bearing 865a and the second bearing 865b. A proximal end 892 of the flipper arm 866 relative to a distal end 893 with respect to the stopper 862 may be configured to sit in the first bearing 865a and the second bearing 865b. The flipper arm 866 may be configured to rotate on the first bearing 865a and the second bearing 865b.

FIG. 9A is a close-up view of an example embodiment of a media tray 960 with a flipper arm 966 in a horizontal position and a stopper 962 coupled to the flipper arm 966. In the example embodiment, the flipper arm 966 is empty and in a horizontal position of the media tray 960 relative to the stopper 962. Since the flipper arm 966 is empty, the first groove 927a is visible. The stopper 962 has a second groove 927b in which a rod may be dispensed following exit from the first groove 927a of the flipper arm 966.

FIG. 9B is a side view of the example embodiment of FIG. 9A in which the flipper arm 966 is in a horizontal position and empty.

Figure 9D:
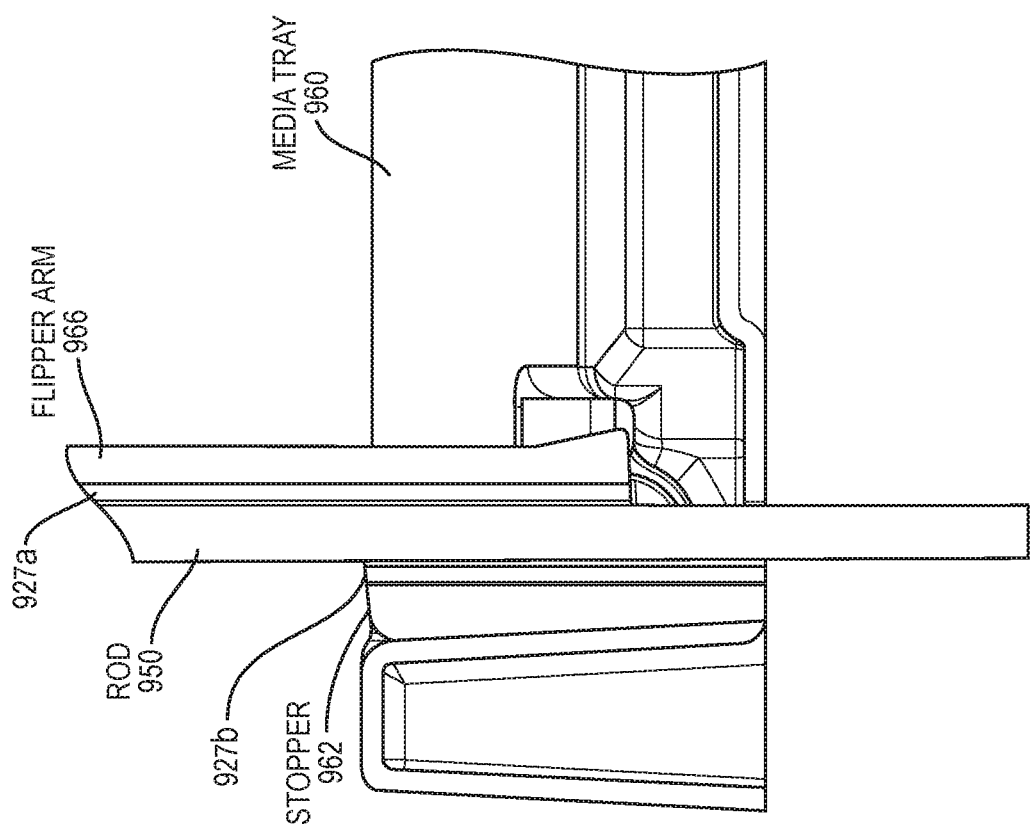
FIG. 9D is a side view of an example embodiment of a media tray with a flipper arm in a vertical position enabling a rod to be dropped down through a feed shaft.
Figure 9C:
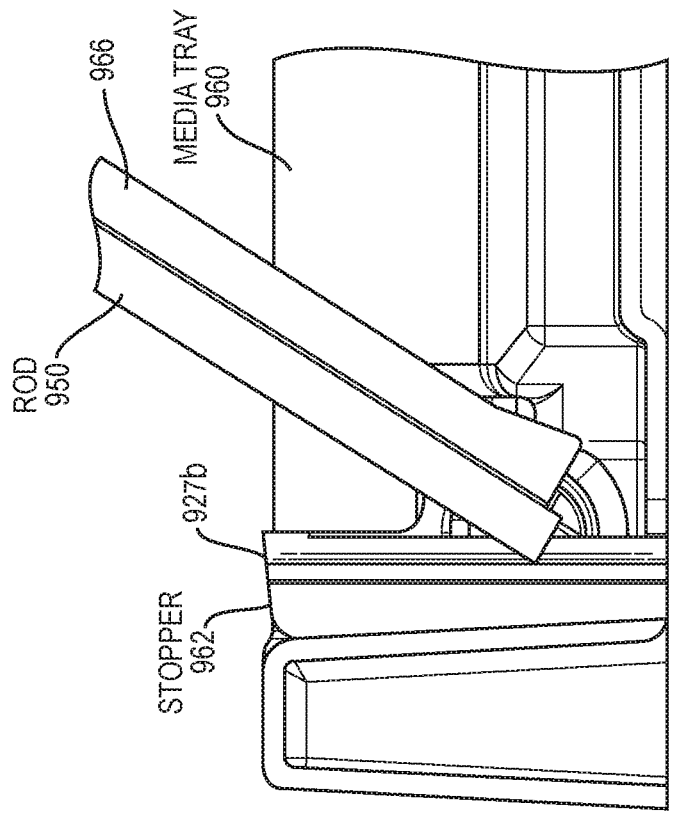
FIG. 9C is a side view of an example embodiment of a media tray with a flipper arm partially rotated toward a vertical position and with a rod positioned within the flipper arm.

FIG. 9C is a side view of an example embodiment of the media tray 960 with the flipper arm 966 partially rotated toward a vertical position and with a rod 950 positioned within the flipper arm 966. According to an example embodiment, the flipper arm 966 may be configured with the stopper 920 such that the rod 950 only falls out (i.e., is dispensed) in an event the rod is substantially vertical. The stopper 962 is positioned at the end of the rod 950 such that the rod 950 can only go past the stopper if the flipper arm 966 is substantially vertical and, thus, the rod 950, is substantially vertical, as illustrated in FIG. 9D, disclosed below.

FIG. 9D is a side view of an example embodiment of the media tray 960 with the flipper arm 966 in a vertical position enabling the rod 950 to be dropped down through a feed shaft formed by the first groove 927a and the second groove 927b of the flipper arm 966 and stopper 962, respectively. Once a rod is dropped through the feed shaft and out of the feeder assembly, it may be fed into a drive system, such as the drive system 104 of FIG. 1C, disclosed above. It should be understood that the flipper arm 966 need not be exactly vertical for the rod 950 for the feed shaft to be formed and the rod 950 to be released, that is, fed, to the drive system.

According to an example embodiment, the media tray 960 and/or flipper arm 966 may have multiple cutouts (not shown) for sensors (not shown). The feeder assembly may have a sensor(s) located, for example, above or below the media tray 960 or flipper arm 966, for detecting if the rod 950 is ready to be flipped (i.e., dispensed). Such sensor(s) may be infrared (IR) sensors, or any other suitable sensors.

Such sensors may be used along a side of the media tray 960 to detect if the rod 950 has fallen out of a cartridge, such as the cartridge 215 of FIG. 2, disclosed above, and into the media tray 960. Such sensors may be disposed above and below the media tray. According to an example embodiment, the flipper arm 966 may define holes along its groove and sensor(s) may be located above and below the media tray 960 such that rays emitted from the sensor may be transmitted in a direction of the holes to enable a detector to detect the rays via the holes to enable detection of presents of the rod in the flipper arm 966.

Figure 10:
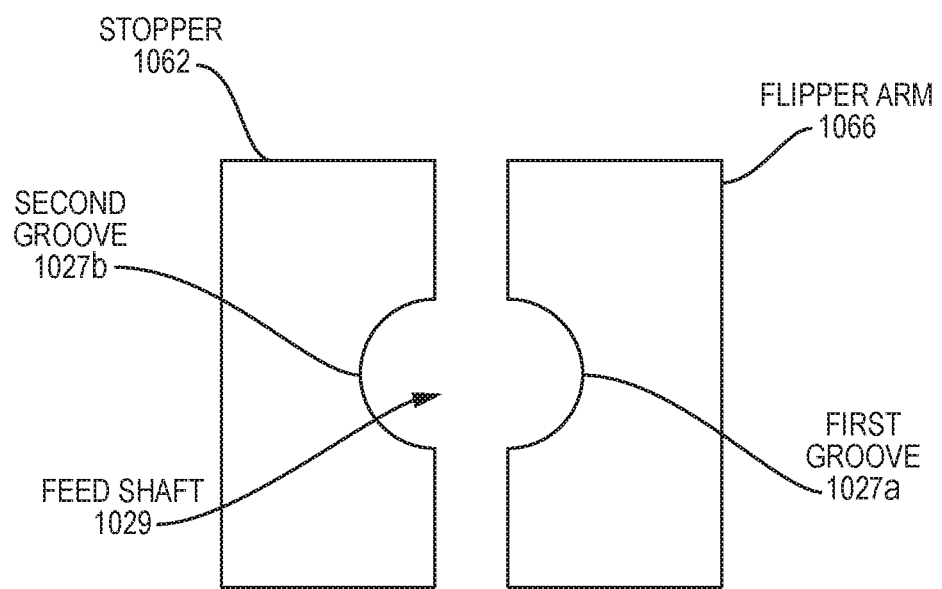
FIG. 10 is a block diagram of an example embodiment of a top-down view of a feed shaft.

FIG. 10 is a block diagram of a top-down view of an example embodiment of a feed shaft 1029. In the example embodiment, the flipper arm 1066 has been rotated to a vertical position and the feed shaft 1029 is formed by a first groove 1027*a* of the flipper arm 1066 and a second groove 1027*b* of the stopper 1062. While the top-down view of the example embodiment shows the flipper arm 1066 in the vertical position, it should be understood that the flipper arm 1066 need not be fully vertical for the feed shaft 1029 to be formed in order for the rod to be released, that is, fed, to the drive system via the feed shaft 1029.

Figure 11:
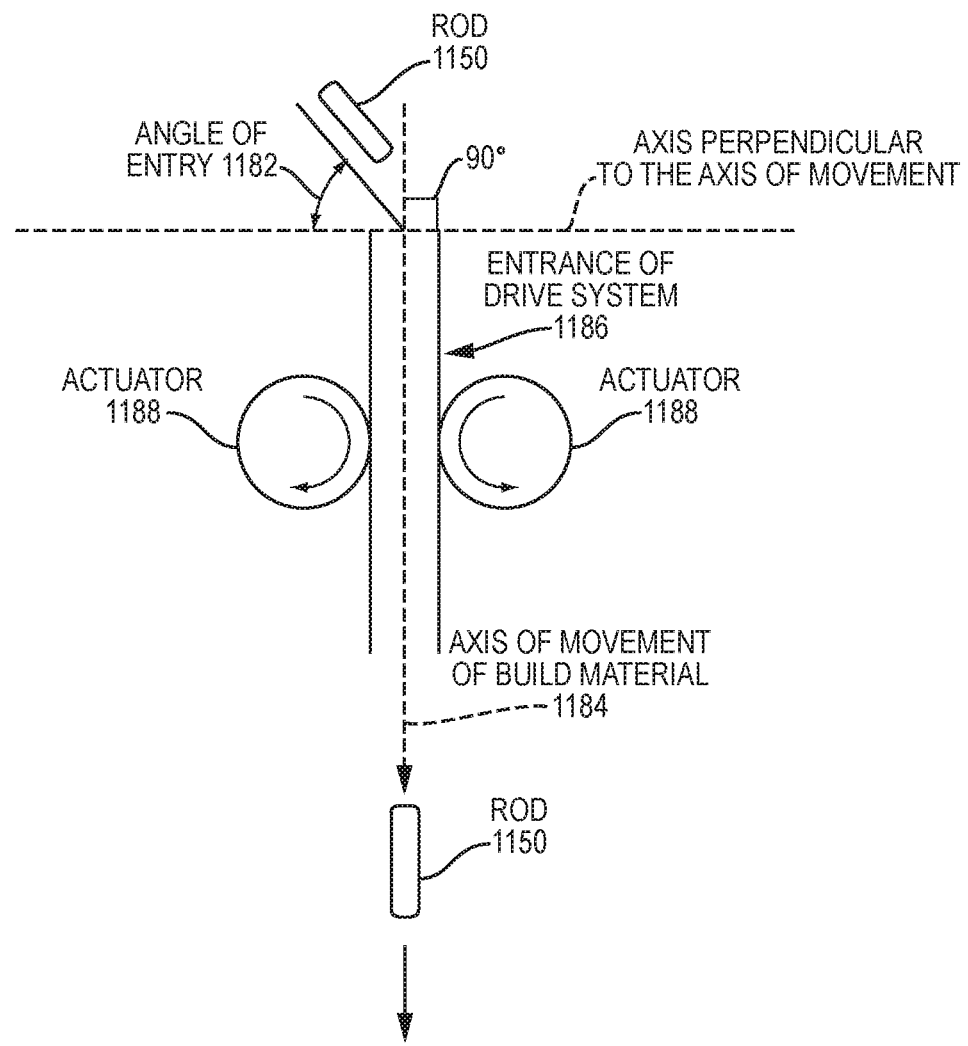
FIG. 11 is a block diagram of an example embodiment of an angle of entry of a rod into a drive system.

FIG. 11 is a block diagram of an example embodiment of an angle 1182 of entry of a rod 1150 into an entrance 1186 of a drive system. As illustrated, the angle 1182 is such that the rod 1150 does not enter an entrance 1186 of a drive system substantially parallel to an axis 1184 of movement of the drive system, that is, an axis of a path taken by the rod 1150 that is driven by an actuator 1188 of the drive system to drive the rod 1150 such that it is heated and extruded. According to an example embodiment, a flipper arm, such as the flipper arm 966 of FIGS. 9A-D, disclosed above, may be configured to dispense a rod held by the flipper arm, such as the rod 950 of FIGS. 9A-D, in a manner that positions the rod 950 to enter the entrance 1186 at an angle of entry such that the rod is substantially parallel to the axis 1184 of movement as it enters the drive system at the entrance 1186.

It should be understood that the axis 1184 of movement may not be vertical. As such, the flipper arm may not be rotated to a vertical position. Rather, the flipper arm may be rotated such that the rod is dispensed from the flipper arm in a manner that enables the rod to be substantially parallel to the axis 1184 of movement. According to an example embodiment, the flipper arm may be configured to rotate away from the bottom ridge of the media tray and toward the stopper, as disclosed above, and to a position that aligns a longitudinal axis of the flipper arm, such as the longitudinal axis 876 of the flipper arm 866 of FIG. 8B, disclosed above, to be substantially parallel with the axis 1184 of movement of the drive system.

Figure 12:
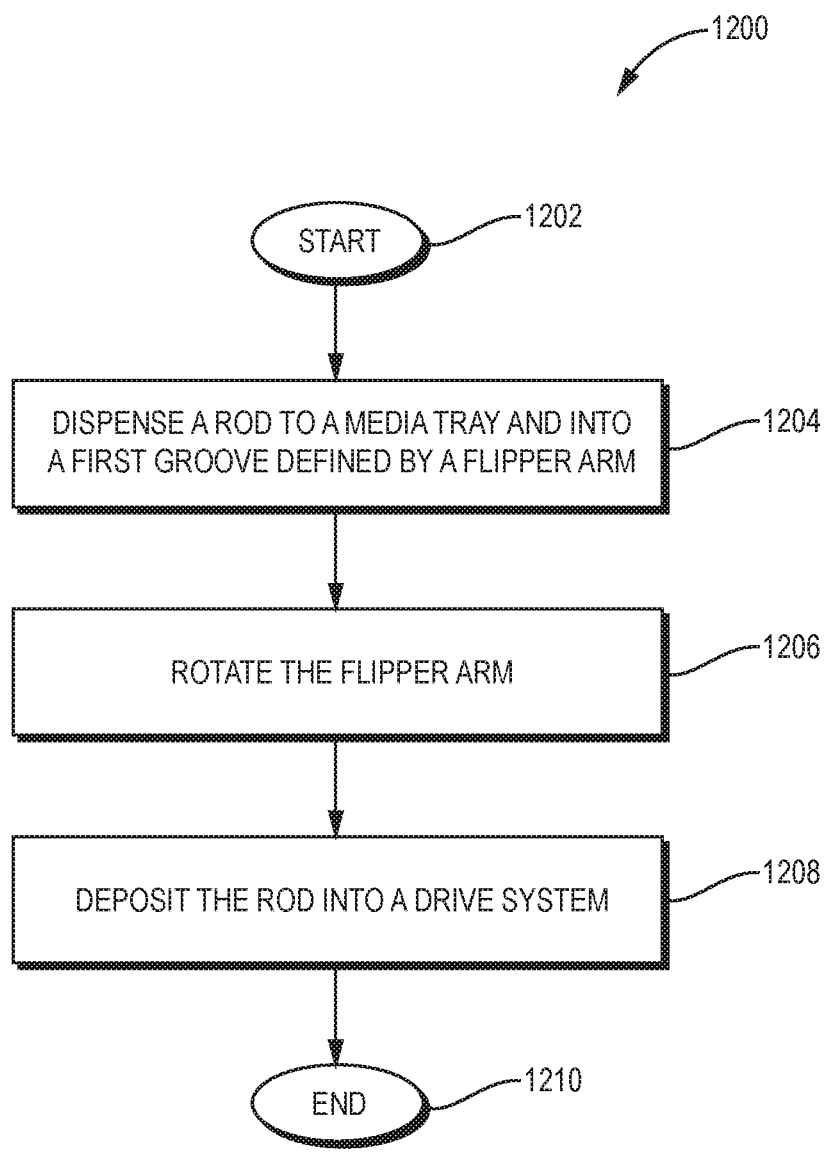
FIG. 12 is a flow diagram of an example embodiment of a method for feeding rods to a 3D printing system.

FIG. 12 is a flow diagram of an example embodiment of a method for dispensing rods within a three-dimensional (3D) printing system (1200). The method begins (1202) and dispenses a rod to a media tray and into a first groove defined by a flipper arm in a substantially horizontal position supported by a bottom ridge of the media tray (1204). The method rotates the flipper arm away from the bottom ridge and toward a stopper coupled to the flipper arm and the media tray, the stopper defining a second groove (1206). The method deposits the rod into a drive system of the 3D printing system via a feed shaft formed by the first and second grooves of the flipper arm and stopper, respectively (1208), and the method thereafter ends (1210), in the example embodiment.

Rotating may include rotating the flipper arm to a substantially vertical position, such as the substantially vertical position disclosed above with regard to FIG. 8B.

FIG. 13 is a block diagram of an example of the internal structure of a computer 1300 in which various embodiments of the present disclosure may be implemented. The computer 1300 contains a system bus 1302, where a bus is a set of hardware lines used for data transfer among the components of a computer or processing system. The system bus 1302 is essentially a shared conduit that connects different elements of a computer system (e.g., processor, disk storage, memory, input/output ports, network ports, etc.) that enables the transfer of information between the elements. Coupled to the system bus 1302 is an I/O device interface 1304 for connecting various input and output devices (e.g., keyboard, mouse, displays, printers, speakers, etc.) to the computer 1300. A network interface 1306 allows the computer 1300 to connect to various other devices attached to a network. Memory 1308 provides volatile or non-volatile storage for computer software instructions 1310 and data 1312 that may be used to implement embodiments of the present disclosure, where the volatile and non-volatile memories are examples of non-transitory media. Disk storage 1314 provides non-volatile storage for computer software instructions 1310 and data 1312 that may be used to implement embodiments of the present disclosure. A central processor unit 1318 is also coupled to the system bus 1302 and provides for the execution of computer instructions, such as computer instructions that may drive the control system 118 of FIG. 1C, disclosed above.

Further example embodiments disclosed herein may be configured using a computer program product; for example, controls may be programmed in software for implementing example embodiments. Further example embodiments may include a non-transitory computer-readable medium containing instructions that may be executed by a processor, and, when loaded and executed, cause the processor to complete methods described herein. It should be understood that elements of the block and flow diagrams may be implemented in software or hardware, such as via one or more arrangements of circuitry, disclosed above, or equivalents thereof, firmware, a combination thereof, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random access memory (RAM), read only memory (ROM), compact disk read-only memory (CD-ROM), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein. Further, example embodiments and elements thereof may be combined in a manner not explicitly disclosed herein.

While example embodiments have been particularly shown and described, it will be understood by those skilled in the art that various changes in form and details may be made therein without departing from the scope of the embodiments encompassed by the appended claims.

What is claimed is:

1. A cartridge comprising:
a housing configured to be received by a three-dimensional printer, the housing having an interior region for storing a plurality of rods of building material;
a rotatable roller located at a downstream end of the housing and in communication with the interior region, wherein the roller has a slot extending along a length of the roller, and wherein the slot is configured to receive at least a portion of a first rod of the plurality of rods therein, so that when the first rod is received within the slot, a length of the first rod extends along the length of the roller;
a ramp located within the interior region, wherein the ramp is angled so as to direct the plurality of rods toward the roller;
wherein the roller is configured to rotate from a first position to a second position, wherein, in the first position, the slot is oriented within the interior region to receive the first rod, and, in the second position, the slot of the roller is oriented away from the interior region to dispense the first rod from the cartridge to the three-dimensional printer, and wherein the cartridge is configured to removably couple to the three-dimensional printer; and
a flipper arm configured to receive the first rod and rotate to deposit the first rod to a feed shaft.

2. The cartridge of claim 1, further comprising the plurality of rods of building material stored within the housing, wherein the building material includes at least one of a binder or a metal powder.

3. The cartridge of claim 2, wherein the each of the plurality of rods has a latitudinal axis that is oriented parallel with the slot of the roller.

4. The cartridge of claim 1, wherein the ramp is a first ramp, and wherein the cartridge further comprises a second ramp within the interior region and angled so as to direct the plurality of rods toward the roller.

5. The cartridge of claim 1, wherein the roller includes a protrusion along at least a portion of a circumference of the roller.

6. The cartridge of claim 1, wherein the slot is a first slot, and wherein the roller further includes a second slot.

7. The cartridge of claim 6, wherein the second slot is located opposite of the first slot.

8. The cartridge of claim 1, further comprising a radio-frequency identification tag configured to contain electronically-stored information about the cartridge.

9. The cartridge of claim 8, wherein the information includes at least one of a number of the plurality of rods contained in the cartridge, a type of the building material of the plurality of rods, a manufacturer of the plurality of rods, or a quantity of the plurality of rods that have been dispensed.

10. The cartridge of claim 1, wherein the housing includes a housing exit, and wherein the roller is configured to deliver the first rod received in the slot to the housing exit when the roller is in the second position.

11. A cartridge comprising:
a housing configured to be received by a three-dimensional printer, the housing having an interior region for storing a plurality of rods of building material;
a housing exit configured to permit one of the plurality of rods to pass from the interior region to a region exterior of the housing; and
a rotatable roller having a slot oriented along a length of the roller, wherein the slot is configured to receive at least a portion of the one of the plurality of rods, and wherein rotation of the roller causes the slot to move from a first position to a second position, wherein, in the first position, the slot fluidly communicates with the interior region and is configured to receive the one of the plurality of rods, and wherein, in the second position, the slot fluidly communicates with the housing exit to dispense the one of the plurality of rods to the housing exit, and wherein the cartridge is configured to removably couple to the three-dimensional printer; and
a flipper arm configured to receive the one of the plurality of rods and rotate to deposit it to a feed shaft.

12. The cartridge of claim 11, further comprising the plurality of rods of building material stored in the interior region, wherein the building material includes a metal powder.

13. The cartridge of claim 11, wherein the each of the plurality of rods has a latitudinal axis that is oriented parallel with the slot of the roller.

14. The cartridge of claim 11, wherein the interior region includes at least one ramp angled so as to direct the plurality of rods toward the roller.

15. The cartridge of claim 11, wherein the interior region includes at least two ramps angled so as to direct the plurality of rods toward the roller.

16. The cartridge of claim 11, wherein the roller includes a protrusion along at least a portion of a circumference of the roller.

17. The cartridge of claim 11, wherein the slot is a first slot, and wherein the roller further includes a second slot.

18. The cartridge of claim 17, wherein the second slot is located opposite of the first slot.

19. A cartridge for a three-dimensional printer, the cartridge comprising:
a housing having an interior region;
a plurality of rods of building material located within the interior region, wherein the building material includes a metal powder; and
a rotatable roller located at a downstream region of the housing, wherein the roller includes a slot dimensioned to receive a length of one of the plurality of rods within it, and wherein rotation of the roller transfers the one of the plurality of rods from the interior region to a region exterior of the housing to dispense the one of the plurality of rods from the housing; and
a flipper arm configured to receive the one of the plurality of rods and rotate to deposit it to a feed shaft.

20. The cartridge of claim 19, wherein the interior region includes at least one ramp angled so as to direct the plurality of rods toward the roller.

21. The cartridge of claim 19, wherein the roller includes a protrusion along at least a portion of a circumference of the roller.

22. The cartridge of claim 19, wherein the cartridge is configured to be received by a three-dimensional printer.

* * * * *